(12) United States Patent
Phadke

(10) Patent No.: US 9,292,497 B2
(45) Date of Patent: Mar. 22, 2016

(54) CONTEXT-BASED TRANSLATION

(71) Applicant: Lingua Next Technologies Pvt. Ltd., Pune (IN)

(72) Inventor: Rajeevlochan Phadke, Pune (IN)

(73) Assignee: Lingua Next Technologies Pvt. Ltd., Pune (IN)

(*) Notice: Subject to any disclaimer, the term of this patent is extended or adjusted under 35 U.S.C. 154(b) by 234 days.

(21) Appl. No.: 14/047,665

(22) Filed: Oct. 7, 2013

(65) Prior Publication Data

US 2015/0100301 A1 Apr. 9, 2015

(51) Int. Cl.
*G06F 17/28* (2006.01)

(52) U.S. Cl.
CPC ................... *G06F 17/2836* (2013.01)

(58) Field of Classification Search
CPC ......... G06F 17/20; G06F 17/21; G06F 17/22; G06F 17/27; G06F 17/28; G06F 17/2836; G06F 17/2854; G06F 17/2863; G06F 17/2872

USPC .................... 704/4, 2, 3, 5, 7, 8, 10
See application file for complete search history.

(56) References Cited

U.S. PATENT DOCUMENTS

| | | | |
|---|---|---|---|
| 6,370,498 B1* | 4/2002 | Flores et al. | 704/3 |
| 2010/0291968 A1* | 11/2010 | Ander et al. | 455/556.1 |
| 2011/0077935 A1* | 3/2011 | Viswanadha et al. | 704/7 |
| 2013/0182182 A1* | 7/2013 | Mountain | 348/564 |
| 2015/0073773 A1* | 3/2015 | Acevedo Arizpe et al. | 704/9 |

* cited by examiner

*Primary Examiner* — Qi Han
(74) *Attorney, Agent, or Firm* — Greenberg Traurig, LLP

(57) ABSTRACT

A method and a system for translating sections of one or more applications are disclosed. The method includes capturing and storing text phrases of the sections. The method further includes capturing and storing of screen shot images of the sections. The captured text phrases and the screen shot images are then combined to provide a context-based translation of the sections.

22 Claims, 5 Drawing Sheets

CONTEXT-BASED TRANSLATION

TECHNICAL FIELD

The presently disclosed embodiments relate to translation processes. More particularly, the presently disclosed embodiments relate to methods and systems for translation of web applications and desktop applications.

BACKGROUND

The need for language translation and language translation tools has become increasingly important. With businesses expanding globally, a need has also arisen to provide various business applications in local languages. In order to fulfill this need, a number of language translation methods and language translation tools have been developed.

The present tools available for translation allow manual translation, but the translator does not have any context regarding what he is translating. In addition, the translation entered using such tools is not always accurate since words can have multiple meanings when used in different contexts. Thus, the translation is not very accurate due to absence of context.

Therefore, there is need for a method and a system for assisting context-based translation, thereby providing correct and faster translations.

SUMMARY

According to embodiments illustrated herein, there is provided a method for developing corpora of context-based phrase translations for translating one or more sections of one or more applications. The method includes storing a plurality of text phrases present on the one or more sections. A plurality of screen shot images of the one or more sections is then stored in accordance with a pre-defined condition. Thereafter, the plurality of text phrases and the plurality of screen shot images are combined to generate the corpora of context-based phrase translations.

According to embodiments illustrated herein, there is provided a method for translating one or more sections of one or more applications. The method includes storing a plurality of text phrases present on the one or more sections. A plurality of screen shot images of the one or more sections are then stored in accordance with a first pre-defined condition. Thereafter, the plurality of text phrases and the plurality of screen shot images are combined to generate a context-based translation request in accordance with a second pre-defined condition. Once the context-based translation request is generated, a plurality of translated text phrases is received on the basis of the context-based translation request. The plurality of translated text phrases is then applied to the one or more sections.

According to embodiments illustrated herein, there is provided a system for translating one or more sections of one or more applications. The system includes a phrase capture module for capturing and storing a plurality of text phrases present on the one or more sections. The system further includes an image capture module for capturing and storing a plurality of screen shot images of the one or more sections in accordance with a first pre-defined condition. The system further includes a translation request module for generating a context-based translation request, wherein the translation request module generates the context based translation request by combining the plurality of text phrases and the plurality of screen shot images in accordance with a second pre-defined condition. The system further includes a receiving module for receiving a plurality of translated text phrases on the basis of the context-based translation request. The system further includes an application module for applying the plurality of translated text phrases to the one or more sections.

According to embodiments illustrated herein, there is provided a computer program product. The computer program product includes a computer readable program code. The computer readable program code is used by the computer to store a plurality of text phrases present on the one or more sections. The computer readable program code is further used to store a plurality of screen shot images of the one or more sections in accordance with a first pre-defined condition. The computer readable program code is further used to combine the plurality of text phrases and the plurality of screen shot images to generate a context-based translation request in accordance with a second pre-defined condition. The computer readable program code is further used to receive a plurality of translated text phrases on the basis of the context-based translation request. The computer readable program code is further used to apply the plurality of translated text phrases to the one or more sections.

BRIEF DESCRIPTION OF DRAWINGS

The accompanying drawings illustrate various embodiments of systems, methods, and/or other aspects of the invention. Any person having ordinary skill in the art will appreciate that the illustrated element boundaries (such as boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

The present disclosure is best understood with reference to the detailed figures and descriptions set forth herein. Various embodiments are discussed below with reference to the figures. However, those skilled in the art will readily appreciate that the detailed descriptions given herein with respect to the figures are simply for explanatory purposes as systems and methods may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Figure 1:
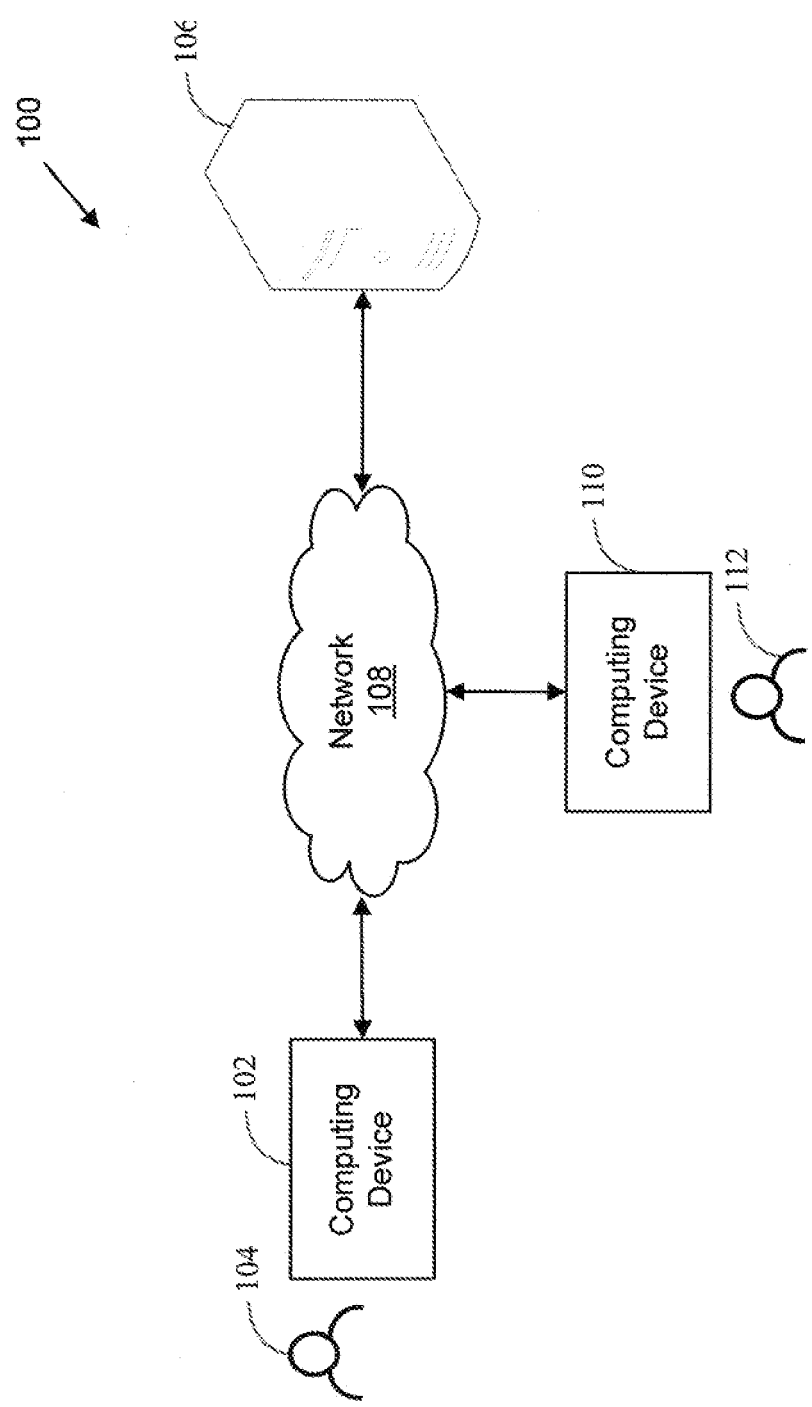
FIG. 1 is a block diagram illustrating a system environment, in accordance with various embodiments.

FIG. 1 is a block diagram illustrating a system environment 100, in accordance with various embodiments.

The system environment 100 is shown to include a computing device 102 operated by a user 104, a server 106, and a computing device 110 operated by a translator 112. The computing device 102 and the server 106 communicate with each other through a network 108.

The computing device 102 may be any device capable of receiving an input from the user 104 on a user interface displayed on a screen. The user 104 may be the owner of the computing device 102 or an administrator or user operating the computing device 102.

Similarly, the computing device 110 may be any device capable of receiving inputs from the translator 112 on a user interface displayed on its screen. The translator 112 is a human who performs translation of text displayed to him/her on the user interface and inputs the corresponding translated text. The user interface for receiving translated text inputted by the translator 112 is facilitated by a tool being executed on the computing device 110. The tool can be a software application that displays source text to be translated and corresponding screen shot images (discussed later) to assist the translator 112 in appropriately translating the source text. The tool also displays an area where the translator 112 can input the translated text.

Examples of the computing devices 102 and 110 may include, but are not limited to, a laptop, a tablet computer, a desktop computer, and other such devices having a display screen that displays a user interface. Although one type of computing devices 102 and 110 has been shown in the FIG. 1, it may be appreciated that the disclosed embodiments can be extended to a large number and variety of computing devices.

The server 106 captures and stores text phrases present on one or more sections of the one or more applications being displayed on the computing device 102. In an embodiment, the one or more applications may correspond to one or more web applications or one or more web pages of one or more web applications, and the one or more sections may correspond to one or more portions of text present on the one or more web applications or the one or more web pages. In another embodiment, the one or more applications may correspond to one or more desktop applications and the one or more sections may correspond to one or more portions of text present on one or more screens of the one or more desktop applications. The server 106 also stores screen shot images of the one or more sections. The server 106 also captures timestamps at which the screen shot images are captured. The server 106 then provides the captured text phrases and the screen shot images to the translator 112 through the tool installed on the computing device 110. The translator 112 uses the tool to generate corpora of context-based phrase translations. In an embodiment, the translator 112 inputs the translated text for the captured text phrase based on the context of the screen shot images. A user interface for inputting the translated text is further described with reference to FIG. 4. The tool collates the translated text input (provided by the translator 112), the corresponding screen shots, and the captured text phrases to create corpora of context based translations. Further, the tool transmits the created corpora to the server 106, where the server 106 stores the corpora of context based-translations. In an embodiment, the capturing and storing of text phrases and the screen shot images of the one or more sections is performed by the server 106. In another embodiment, the capturing and storing of text phrases and the screen shot images of the one or more sections may be performed by the computing device 102.

The server 106 may be any dedicated hardware capable of performing communication with the computing devices 102 and 110. Examples of server 106 may include a computer system running on a server operating system, and other devices that may be present in a data center or in any server farm hosted by a specific client. The operating system may be 'Unix', 'Windows', 'Linux', 'Android', 'iOS', or any other server operating system. Although one server 106 has been shown in FIG. 1, it may be appreciated that the disclosed embodiments can be extended to a large number and variety of servers.

The network 108 corresponds to a medium through which various components of the system environment 100 communicate with each other. Examples of the network 108 may include, but are not limited to, a television broadcasting system, an Internet Protocol television (IPTV) network, the Internet, a Wireless Fidelity (Wi-Fi) network, a Wide Area Network (WAN), a Local Area Network (LAN), a telephone line (POTS), or a Metropolitan Area Network (MAN). Various devices in the system environment 100 can connect to the network 108, in accordance with various wired and wireless communication protocols, such as Transmission Control Protocol and Internet Protocol (TCP/IP), User Datagram Protocol (UDP), and 2G, 3G, or 4G communication protocols.

Figure 2:
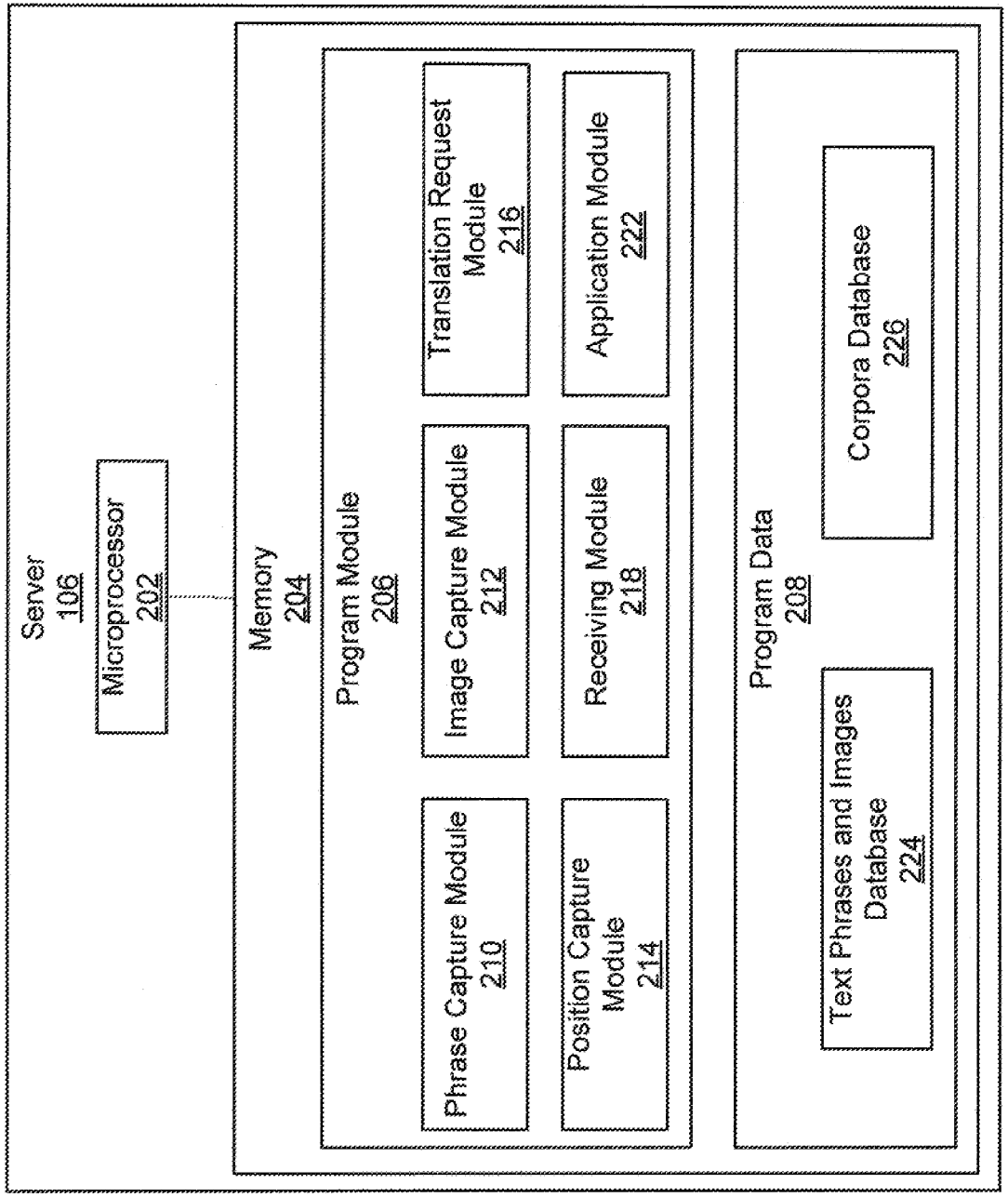
FIG. 2 is a block diagram illustrating a server for translating one or more sections of one or more applications, in accordance with various embodiments.

FIG. 2 is a block diagram illustrating the server 106 for translating one or more sections of one or more applications, in accordance with various embodiments. To describe the server 106, references will be made to FIG. 1, although it will be apparent to those skilled in the art that the implementation details of the block diagram can be applicable to any other embodiment of the present invention.

The server 106 includes a microprocessor 202 coupled to a memory 204. The memory 204 includes a program module 206 and a program data 208. The microprocessor 202 executes instructions stored in program module 206 and stores one or more variables in program data 208. The program module 206 includes a phrase capture module 210, an image capture module 212, a position capture module 214, a translation request module 216, a receiving module 218, and an application module 222.

The program data 208 includes a text phrases and images database 224 and a corpora database 226. The text phrases and images database 224 stores the text phrases and the screen shot images of the sections captured by the server 106. The corpora database 226 stores corpora of translated text phrases. Corpora generally refer to a large or complete collection of writings. Hence, the corpora of translated text phrases include a collection of translations of text phrases captured by the server 106. In an embodiment, the text phrases and the screen shot images may be stored together in the text phrases and images database 224. In another embodiment, the text phrases and the screen shot images may be stored separately in different databases. In yet another embodiment, the text phrases, the screen shot images and the corpora may all be stored in the same database.

The phrase capture module 210 captures the text phrases of the sections of one or more applications being displayed on the computing device 102. In an embodiment, the one or more applications may correspond to one or more web applications or one or more web pages of one or more web applications, and the one or more sections may correspond to one or more portions of text present on the one or more web applications or the one or more web pages. In another embodiment, the one or more applications may correspond to one or more desktop applications and the one or more sections may correspond to one or more portions of text present on one or more screens of the one or more desktop applications. The phrase capture module 210 also captures timestamps associated with the capturing of preferably each of the text phrases. In an embodiment, the capturing of the text phrases of the sections may be carried out using an API (Application Program Interface) interception. The one or more applications may correspond to, but not are limited to, various enterprise level software. The enterprise level software may include, but are not limited to, business-oriented tools such as online shopping and online payment processing, interactive product catalogue, automated billing systems, security, enterprise content management, IT service management, customer relationship management, enterprise resource planning, business intelligence, project management, collaboration, human resource management, manufacturing, enterprise application integration, and enterprise forms automation.

The phrase capture module 210 then stores preferably all the captured information (e.g., text phrases and corresponding timestamps) in the text phrases and images database 224.

The image capture module 212 captures the screen shot images of various sections of the one or more applications. In an embodiment, the image capture module 212 captures the screen shot images at a pre-defined time intervals. In an embodiment, the capturing of the screen shot images may be carried out using an automatic periodic screen bitmap saving option. The pre-defined time intervals may depend on, but is not limited to, the speed at which the one or more sections are changed. The image capture module 212 also captures timestamps associated with the capturing of preferably each of the screen shot images. The position capture module 214 captures the exact position of each of the text phrases on the sections. Capturing the exact position such as X-Y coordinates of the text phrases on the sections helps in providing correct translation of the text phrases.

The image capture module 212 and position capture module 214 then store preferably all the captured information (e.g., screen shot images, and position information such as X-Y coordinates of the captured text phrases) in the text phrases and images database 224.

In an embodiment, the tool running on the computing device 110 may access the text phrases and images database 224 and present the text phrases and corresponding screen shot images to the translator 112. In another embodiment, the data contained in the text phrases and images database 224 is communicated to the translator 112 using an email (which may be in an MS Excel, MS Access, and any other suitable format).

In an embodiment, the screen shot image corresponding to each text phrase is permanently displayed against the text phrase. In another embodiment, the screen shot image corresponding to each text phrase can be selectively displayed against the text phrase based on the selection by the translator 112.

The corpora of context-based phrase translations are generated by the translator 112. The stored text phrases, screen shot images and their associated timestamps are provided to the translator 112 through the tool. The translator 112 accesses the tool to generate a corpora of context-based phrase translations (as described in FIG. 3 and FIG. 4). The translator 112 inputs translated text corresponding to the text phrase against preferably each pair of the text phrase and corresponding screen shot image. The tool then stores the corpora of context based-translations in the corpora database 226. In another embodiment, the translator 112 communicates the corpora of context based-translations to the server using a suitable communication medium including but not limited to Email or File Transfer Protocol (FTP).

The translation request module 216 generates a context-based translation request based on a pre-defined condition. The pre-defined condition corresponds to, but is not limited to, highlighting each of the plurality of translated text phrases in the corresponding screen shot image on the basis of the timestamp. The context-based translation request is generated by combining the text phrases and the screen shot images.

On receiving the context-based translation request from the translation request module 216, the receiving module 218 retrieves the translated text phrases from the corpora database 226. In an embodiment, the receiving module 218 retrieves the translated text phrases by performing phrase look-up in the corpora database 226 for preferably each of the text phrases in the context-based translation request.

The application module 222 then applies the translated text phrases to the one or more sections. In an embodiment, in order to apply the translated text phrases to the one or more sections, the modifications preferably are made in the virtual machine that provides an execution medium in the case of a JAVA application.

Figure 3:
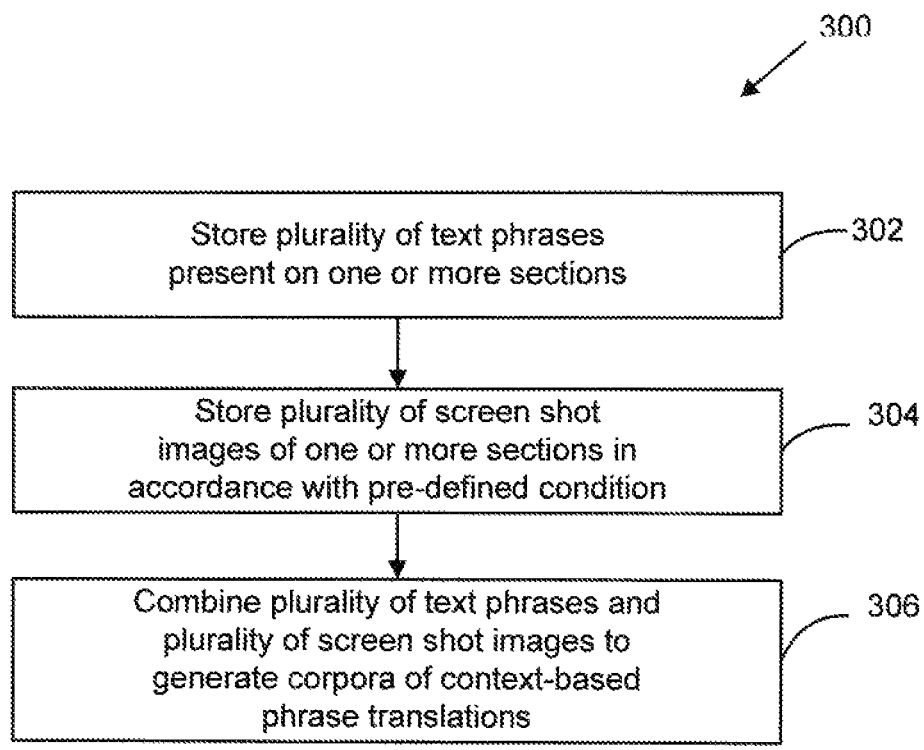
FIG. 3 is a flow diagram illustrating a method for developing corpora of context-based phrase translations for translating one or more sections of one or more applications, in accordance with various embodiments.

FIG. 3 is a flow diagram 300 illustrating a method for developing corpora of context-based phrase translations for translating one or more sections of one or more applications, in accordance with various embodiments.

At step 302, text phrases present on the sections of the applications for which the translation needs to be performed are captured and stored in the text phrases and images database 224. The text phrases and images database 224 also stores timestamps and position information associated with preferably each of the text phrases. In an embodiment, the capturing of the text phrases of the sections may be carried out using an API (Application Program Interface) interception.

At step 304, screen shot images of the sections are captured and stored in the text phrases and images database 224. In an embodiment, the capturing of the screen shot images may be carried out using a screen bitmap saving option. The screen shot images are captured and stored based on a pre-defined condition. The pre-defined condition may be, but not limited to, storing each of the screen shot images at a plurality of intervals or based on a receipt of the capture request. The plurality of intervals may depend on, but are not limited to, the speed at which the one or more sections are changed. The text phrases and images database 224 also stores timestamps associated with preferably each of the screen shot images.

In an embodiment, the capture of the text phrases and screen shot images happens simultaneously. For example, in an embodiment, a user (e.g., a test engineer) opens various interfaces of an application one by one and commands (e.g., raises a capture request to) the server 106 to initiate the capture of the text phrases and screen shot images. In another embodiment, the capture of the text phrases and screen shot images is carried out by the server 106 automatically at regular intervals. By doing so, when the test engineer completes opening all the interfaces facilitated by the application, the server 106 has all the text phrases and screen shot images of all the interfaces stored in the text phrases and images database 224.

At step 306, the text phrases and the screen shot images are combined to generate corpora of context-based phrase translations. Corpora generally refer to a large or complete collection of writings. Hence, corpora of translated text phrases include a collection of translation of text phrases captured by the server 106. The corpora of context-based phrase translations are generated by the translator 112. The stored text phrases, screen shot images and their associated timestamps are displayed to the translator 112 through the tool installed on the computing device 110. The translator 112 then inputs translation of the text phrases against each of the text phrases in the user interface provided by the tool. In order to provide an appropriate translation, the translator 112 may also look at the corresponding screen shot image captured for each of the text phrases.

The translated phrases (inputted by the translator 112) are then stored in the corpora database 226 along with the text phrases and the screen shot images. The corpora database thus generated is used by the server 106 to translate the text phrases of the application when requested by a user operating the application.

Figure 4:
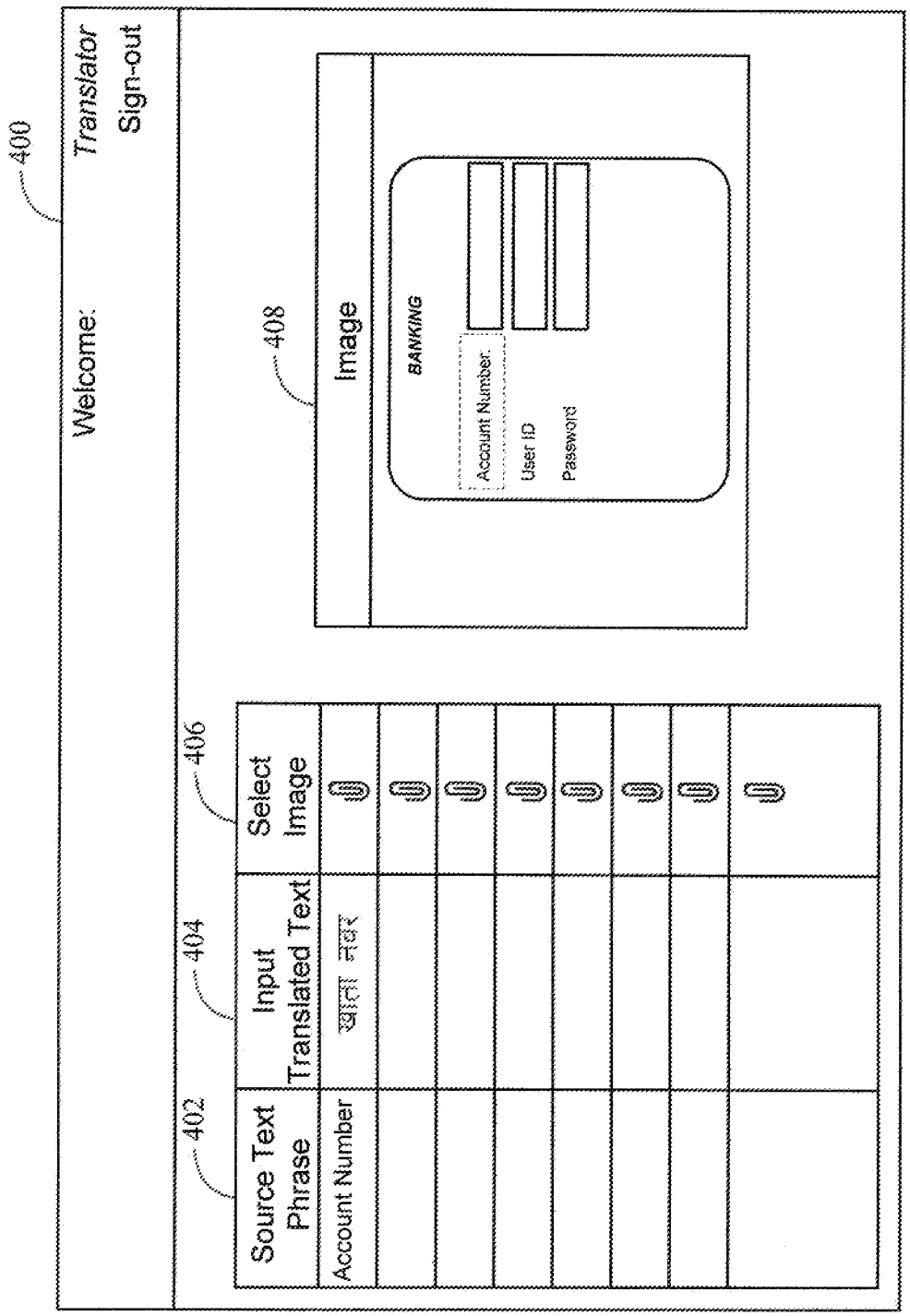
FIG. 4 is a user interface provided by a tool installed on a computing device for providing context-based translation, in accordance with various embodiments.

FIG. 4 is a user interface 400 provided by a tool used for providing context-based translation, in accordance with various embodiments.

In an embodiment, the tool is a software application that facilitates the translator 112 to input translated text corresponding to the text phrases of various applications. In order to do so, the tool presents the user interface 400 to the translator 112.

The user interface 400 contains three columns: a source language phrases column 402, a target language phrases column 404 and an image column 406. The user interface also includes a screen pop-up section 408. The source language phrases column 402 contains the text phrases captured from the sections.

The source language phrases column 402 contains (i.e., in various rows) the text phrases captured from the applications as discussed above.

Target language phrases column 404 provides an area to the translator 112 to input the translated text corresponding to the source text phrase contained in the source language phrases column 402.

In an embodiment, the image column 406 is optional and need not be presented. In this case, when the translator 112 selects a text phrase from the source language phrases column 402, the timestamp of the selected text phrase is matched with the timestamp of the corresponding screen shot image. The screen pop-up section 408 then presents the screen shot image on which the selected text phrase is present. For example, the screen shot image shown is a user login interface of a banking application.

In another embodiment, the translator 112 is also presented with the image column 406. The image column 406 contains the screen shot image (e.g., as an attachment or embedded object) containing the text phrase displayed in the source language phrases column 402. In this case, the translator 112 can selectively view the screenshot images based on requirements. Thus, when the translator 112 clicks on any of the attachment icon in the image column 406, the corresponding screen shot image gets displayed in the screen pop-up section 408.

For example, the first entry in the source language phrases column 402 is "Account number" and the corresponding screen shot image is displayed in the screen pop-up section 408.

In an embodiment, the screen pop-up section 408 also highlights (shown with the dashed rectangle) the area on the screen shot image where the text phrase is present. This helps the translator 112 to easily see the position of the text phrase on the screen shot image so as to understand the context of the text phrase to be translated. It may be noted that any known technique of highlighting documents may be used by the screen pop-up section 408 for highlighting the area on the screen shot image where the text phrase is present. Thus, by reviewing both the screen shot image and the source text phrase (i.e., "Account Number") the translator 112 may input the following text (e.g., Hindi Language translation of "Account Number"): खाता नंबर

The screen pop-up section 408 and the highlighted portion on the screen pop-up section 408 provide a context for translating the selected text phrase. The translation of the text phrases in a language desired by a user is then inputted in the target phrases column 404 by the translator 112. Due to the context available through the screen pop-up section 408, the translator 112 is able to provide an accurate translation of the text phrases. The tool then collates the translations, the corresponding context and the source phrase for which the translation has been provided to generate corpora of context-based phrase translations. This process is repeated multiple times so as to increase the size of the corpora of context-based phrase translations. The corpora of context-based phrase translations is then stored in the corpora database 226. Once the corpora of context-based phrase translations are generated, a phrase look-up is initiated to provide translated sections to the user in the future.

In an embodiment, some or all functionalities of the source language phrases column 402, the target language phrases column 404, the image column 406, and the screen pop-up section 408 may also be implemented in an MS excel file by pasting the screen-shots inside the excel worksheet along with the source language phrases for that screen. The MS excel file thus prepared may then be used by the translator 112 as the tool to input the translated text against the text phrases by not only referring to the text phrases but also referring to the corresponding screen shot images.

Figure 5:
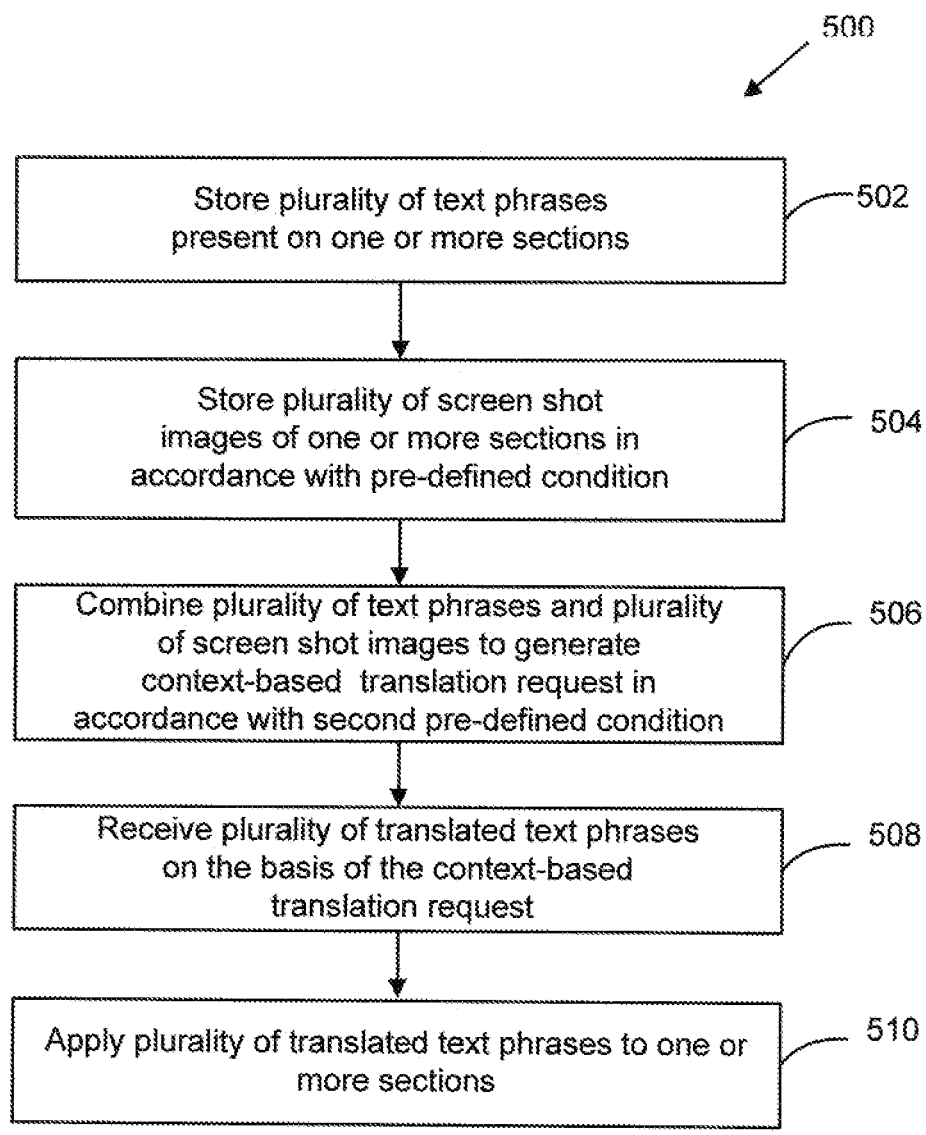
FIG. 5 is a flow diagram illustrating a method for translating one or more sections of one or more applications, in accordance with various embodiments.

FIG. 5 is a flow diagram 500 illustrating a method for translating one or more sections of one or more applications, in accordance with various embodiments.

At step 502, text phrases of the sections of one or more applications being displayed on the computing device 102 are captured and stored in the text phrases and images database 224. The text phrases and images database 224 also stores the timestamp and the position information associated with preferably each of the text phrases. In an embodiment, the capturing of the text phrases of the sections may be carried out using an API (Application Program Interface) interception.

At step 504, screen shot images of the sections are captured and stored along with their timestamp in the text phrases and images database 224. In an embodiment, the capturing of the screen shot images may be carried out using a screen bitmap saving option. The screen shot images are captured based on a pre-defined condition. The pre-defined condition may be, but is not limited to, storing each of the screen shot images at a plurality of intervals. The plurality of intervals may depend on, but are not limited to, the speed at which the one or more sections are changed.

At step 506, the text phrases and the screen shot images are combined to generate context-based translation request based on a second pre-defined condition. The second pre-defined condition corresponds to, but is not limited to, highlighting each of the plurality of translated text phrases in corresponding screen shot images on the basis of the timestamp. The context based translation request is generated by combining the text phrases and the screen shot images.

As discussed above, the corpora of context-based phrase translations has already been generated by the translator 112 and is stored in the corpora database 226.

At step 508, on receiving the context-based translation request, the translated text phrases are received from the corpora database 226. In an embodiment, a phrase-lookup is performed for each text phrase in the context-based translation request to obtain the corresponding translated text phrase(s) from the corpora database 226.

At step 510, the translated text phrases are applied to the one or more sections for providing the sections to the user in a language desired by the user.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the disclosure.

The computer system comprises a computer, an input device, and a display unit. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface allowing the transfer as well as reception of data from other databases. The communication unit may include a modem, an Ethernet card, or other similar devices which enable the computer system to connect to databases and networks such as LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in various programming languages including, but not limited to, 'C', 'C++', 'Visual C++', 'VB.Net', 'C#.Net', 'ASP.Net', 'Java', and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Windows', 'Unix', 'DOS', 'Android', 'Symbian', 'iOS', and 'Linux'.

The programmable instructions can be stored and transmitted on a non-transitory computer-readable medium. The disclosure can also be embodied in a computer program product comprising the non-transitory computer-readable medium, or with any product capable of implementing the above methods and systems, or the numerous possible variations thereof.

The system, method and computer program product, as described above, have numerous advantages. Some of these advantages may include, but are not limited to, faster and accurate translation of sections (web pages of the web applications or screens of the desktop applications). Since the translator has direct access to the context of the text phrases (through a screen pop-up section of a tool), the accuracy of the translation of the sections is much higher. Further, since the translator does not have to research any outside reference for performing the translation, the speed of translation is much higher than the speed achieved by the conventional language translation approaches.

Further, not all the sections of the applications may need to be translated into a language desired by a user. The user can navigate the sections to be translated and only those selected sections will be translated. In addition, no source code level changes need to be made to the enterprise software. Once the corpora of context-based phrase translations are generated, only a phrase look-up needs to be initiated to provide translated phrases to the user.

Various embodiments of the methods and systems for translating one or more sections of one or more applications have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skill in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, that are also intended to be encompassed by the following claims.

What is claimed is:

1. A method for developing a corpora of context-based phrase translations for translating one or more sections of one or more applications, from a source language to a target language, the method comprising:
   storing a plurality of text phrases present on the one or more sections;
   storing a plurality of screen shot images of the one or more sections in accordance with a pre-defined condition;
   storing a timestamp associated with each of said text phrases and each of said screen shot images; and
   combining the plurality of text phrases and the plurality of screen shot images based on said timestamps, to translate said text phrases to generate the corpora of context-based phrase translations, wherein the above steps are executed by a microprocessor.

2. The method according to claim 1, wherein the one or more applications correspond to one or more web applications.

3. The method according to claim 1, wherein the one or more applications correspond to one or more desktop applications.

4. The method according to claim 1, wherein the pre-defined condition is selected from storing the plurality of screen shot images at a plurality of intervals and the receipt of a capture request.

5. The method of claim 4, wherein the plurality of intervals depends on a speed at which the one or more sections are changed.

6. The method of claim 1 further comprising storing a position of the plurality of text phrases on the one or more sections.

7. The method of claim 1 further comprising communicating the plurality of text phrases and the plurality of screen shot images to a computing device accessible by a human translator.

8. The method of claim 7 further comprising presenting the plurality of text phrases and the plurality of screen shot images on the computing device on a user interface provided by a tool.

9. The method of claim 8 further comprising receiving input indicating translated text corresponding to the plurality of text phrases from the translator through the tool.

10. A method for translating one or more sections of one or more applications, from a source language to a target language, the method comprising:
    storing a plurality of text phrases present on the one or more sections;
    storing a plurality of screen shot images of the one or more sections in accordance with a first pre-defined condition;
    storing a timestamp associated with each of said text phrases and each of said screen shot images;
    combining the plurality of text phrases and the plurality of screen shot images to generate a context-based translation request in accordance with a second pre-defined condition based on said timestamps;
    receiving a plurality of translated text phrases based on of the context-based translation request; and
    applying the plurality of translated text phrases from the corpora of context-based phrase translations to the one or more sections, wherein the above steps are performed by a microprocessor.

11. The method according to claim 10, wherein the one or more applications correspond to one or more web applications.

12. The method according to claim 10, wherein the one or more applications correspond to one or more desktop applications.

13. The method of claim 10, wherein the first pre-defined condition corresponds to storing the plurality of screen shot images at a plurality of intervals.

14. The method of claim 13, wherein the plurality of intervals depends on a speed at which the one or more sections are changed.

15. The method of claim 10, wherein the second pre-defined condition corresponds to highlighting the plurality of translated text phrases in the corresponding screen shot image based on of the timestamp.

16. The method of claim 10 further comprising storing a position of the plurality of text phrases on the one or more sections.

17. A system for translating one or more sections of one or more applications, from a source language to a target language, the system comprising:
    a memory comprising one or more program instruction modules, the one or more program instruction modules comprising:
    a phrase capture module for capturing and storing a plurality of text phrases present on the one or more sections,
    an image capture module for capturing and storing a plurality of screen shot images of the one or more sections in accordance with a first pre-defined condition,
       wherein said phrase capture module and said image capture module captures and stores a timestamp associated with each of said test phrases and each of said screen shot images;
    a translation request module for generating a context-based translation request, wherein the translation request module generates the context based translation request by combining the plurality of text phrases and the plurality of screen shot images in accordance with a second pre-defined condition, based on said timestamps,
    a receiving module for receiving a plurality of translated text phrases based on the context-based translation request,
    an application module for applying the plurality of translated text phrases from the corpora of context-based translated, to the one or more sections; and
    a microprocessor operable to execute the one or more program instruction modules.

18. The system of claim 17, wherein the first pre-defined condition corresponds to storing the plurality of screen shot images at a plurality of intervals.

19. The system of claim 18, wherein the plurality of intervals depends on a speed at which the one or more sections are changed.

20. The system of claim 17, wherein the second pre-defined condition corresponds to highlighting each of the plurality of translated text phrases in the corresponding screen shot image based on the timestamp.

21. The system of claim 17 further comprising a position capture module for storing a position of the plurality of text phrases on the one or more sections.

22. A computer program product for use with a computer, the computer program product comprising a non-transitory computer readable medium having a computer readable program code embodied therein for translating one or more sections of one or more applications, from a source language to a target language, the computer readable program code is used by the computer to:

store a plurality of text phrases present on the one or more sections;

store a plurality of screen shot images of the one or more sections in accordance with a first pre-defined condition;

store a timestamp associated with each of said text phrases and each of said screen shot images;

combine the plurality of text phrases and the plurality of screen shot images to generate a context-based translation request in accordance with a second pre-defined condition based on said timestamps;

receive a plurality of translated text phrases based on the context-based translation request;

apply the plurality of translated text phrases from the corpora of context-based phrase translations to the one or more sections.

* * * * *